(12) United States Patent  
Peterson et al.

(10) Patent No.: US 7,635,443 B2
(45) Date of Patent: Dec. 22, 2009

(54) WIRING HARNESS CLIP AND METHOD OF MAKING SAME FROM AN EXTRUDABLE BLANK

(75) Inventors: David R. Peterson, Aurora, OH (US); Joseph A. Butler, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/403,358

(22) Filed: Apr. 13, 2006

(65) Prior Publication Data

US 2007/0241241 A1 Oct. 18, 2007

(51) Int. Cl.
B29B 47/00 (2006.01)
B29D 19/04 (2006.01)
B28B 11/12 (2006.01)
B28B 11/14 (2006.01)

(52) U.S. Cl. ............ 264/153; 264/157; 264/176.1
(58) Field of Classification Search .......... None
See application file for complete search history.

(56) References Cited

U.S. PATENT DOCUMENTS

| | | | |
|---|---|---|---|
| 2,931,851 A | 4/1960 | Sims | |
| 3,210,030 A | 10/1965 | Ramsey et al. | |
| 4,871,134 A | 10/1989 | Oikawa | |
| 5,012,995 A | 5/1991 | Ward et al. | |
| 5,362,018 A | 11/1994 | Darr et al. | |
| 5,564,672 A * | 10/1996 | Matson | 248/74.3 |
| 5,922,155 A * | 7/1999 | Clouet et al. | 156/51 |
| 6,863,855 B2 * | 3/2005 | Shilale | 264/151 |

* cited by examiner

*Primary Examiner*—Monica A Huson
(74) *Attorney, Agent, or Firm*—Thomas N. Twomey

(57) ABSTRACT

A wiring harness clip has a concave elongate base for taping the wiring harness clip to a bundle of cables and an attachment ear with a hole for attaching the bundle of wires to a support panel or the like. The wiring harness clip is manufactured from an extruded blank that preferably includes two parallel channels for providing the concave elongated bases and a web between the channels for providing attachment ears. Successive attachment ears are stamped with part of one channel to form a wiring harness clip and then with part of the other channel to form another wiring harness clip.

11 Claims, 1 Drawing Sheet

WIRING HARNESS CLIP AND METHOD OF MAKING SAME FROM AN EXTRUDABLE BLANK

FIELD OF THE INVENTION

This invention relates generally to a wiring harness clip and a method of making the same.

BACKGROUND OF THE INVENTION

U.S. Pat. No. 2,931,851 granted to Robert H. Sims Apr. 5, 1960 and U.S. Pat. No. 3,210,030 granted to Charles W. Ramsey et al Oct. 5, 1965 disclose typical wiring harness clips that are attached at predetermined locations along a wiring harness to secure the wiring harness to support panels and the like existing along the route of the wiring harness. Each of these known wiring harness clips comprise a concave elongate base and a self expanding head which is integrally attached to a central portion of the elongate base. The wiring harness clip is attached to the wiring harness by taping the concave elongate base to a bundle of wires forming part of the wiring harness as shown in FIG. 1 of the '851 Sims patent. The wiring harness clip is then attached to a support panel or the like, for instance by inserting the self expanding head through a hole in the support panel.

U.S. Pat. No. 4,871,134 granted to Ryuetsu Oikawa discloses several wiring harness clips that are attached at predetermined locations along a wiring harness to secure the wiring harness to support panels and the like existing along the route of the wiring harness. Each of these known wiring harness clips comprise a flat or concave elongate base that is attached to the wiring harness by taping the elongate base to a bundle of wires forming part of the wiring harness. The wiring harness clip is then attached to a support panel or the like, either by a clamp as shown in FIGS. 1-4 of the Okiawa '134 that is adapted to be secured to a retainer on a support panel (not shown) or by a bolt (not shown) that extends through a hole of the wiring harness clip as shown in FIG. 5 of the Oikawa '134 patent.

U.S. Pat. No. 5,362,018 granted to Christopher J. Darr et al discloses a T-shaped molded clip for a wiring harness having an elongate base that can be taped to a wiring harness. The base includes a web or webs so that the base can be bent to either side for attaching the base to the wiring harness.

Due to their shapes, the wiring harness clips disclosed in the above patents all require an injection molding process to manufacture the particular wiring harness clip. These wiring harness clips may be suitable for their intended purpose. However, the required injection molding manufacture is a relatively expensive procedure.

SUMMARY OF THE INVENTION

In one aspect, this invention provides a wiring harness clip that has a concave elongate base for taping the wiring harness clip to a bundle of wires and an attachment ear with a bolt hole for attaching the bundle of wires to a support panel or the like, and that is shaped for manufacture from an extruded blank. Thus the wiring harness clip of the invention reduces manufacturing cost by using an extrusion and eliminating the need for an injection mold in manufacturing the wiring harness clip which is another aspect of the invention.

DETAILED DESCRIPTION OF PREFERRED EMBODIMENT

Figure 1:
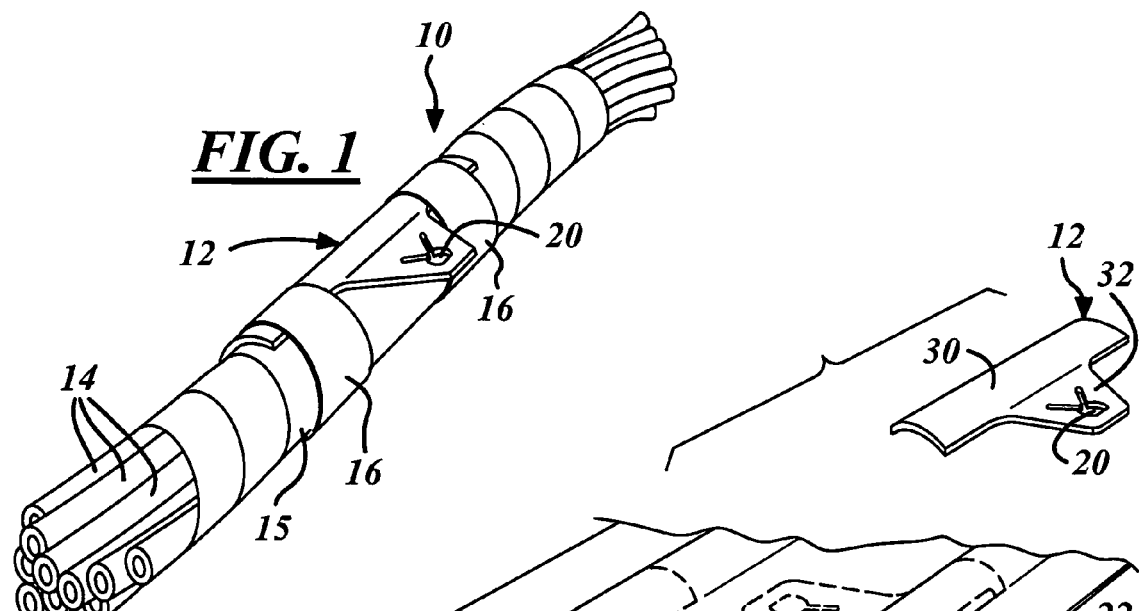
FIG. 1 is a perspective view of an assembly having a wiring harness clip of the invention.
Figure 3:
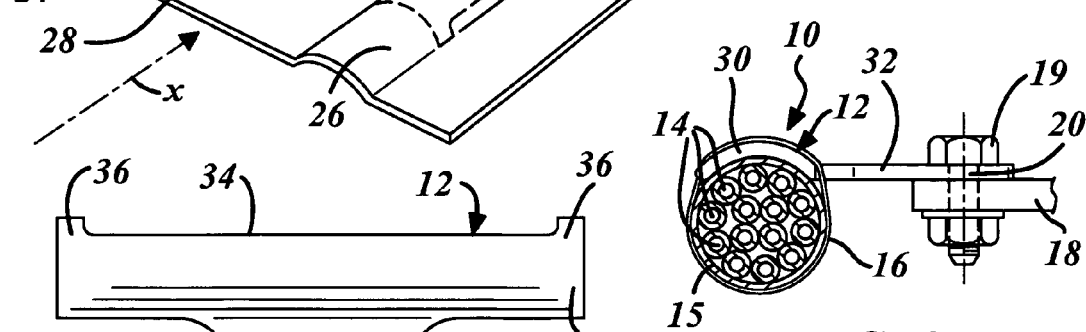
FIG. 3 is an end view of the assembly of FIG. 1 bolted to a support panel.

FIG. 1 is a perspective view of an assembly 10 having a wiring harness clip 12 of the invention attached to a bundle of insulated electric cables 14 by tape 16 wrapped around portions of the wiring harness clip 12 and the bundle of insulated electric cables 14. Tape 16 may be wrapped directly around the bundle of electric cables 14 or the bundle of insulated electric cables 14 may be pre-wrapped with an under layer of tape 15 as shown in FIGS. 1 and 3. Wiring harness clip 12 is shaped to attach the bundle of insulated electric cables 14 to a support panel 18 by a bolt 19 using a hole 20 that extends through the wiring harness clip 12 as shown in FIG. 3.

Figure 2:
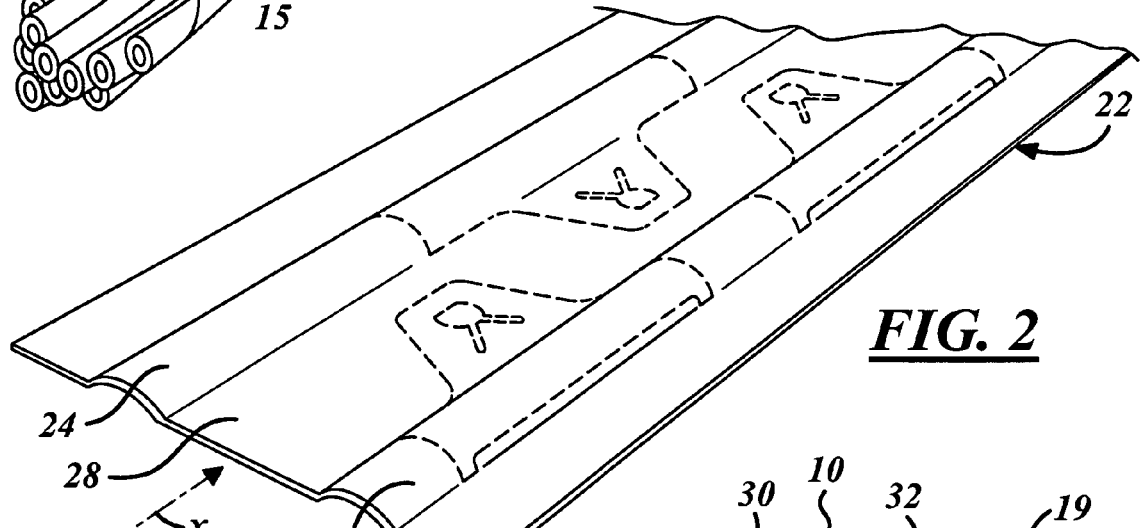
FIG. 2 is a perspective view of the wiring harness clip of FIG. 1 in the process of being manufactured from an extrusion.

Wiring harness clip 12 is made from a blank 22 that is extruded through a shaped die (not shown) in an extrusion direction x. Extrusion blank 22 includes a pair of parallel concave channels 24 and 26 that are parallel to the extrusion direction x and a web 28 that is between the parallel channels 24 and 26. Wiring harness clip 12 is formed, preferably, simply by stamping the wiring harness clip 12 out of extrusion blank 22, that is, out of a part of one of the channels 24 or 26 and out of part of the web 28 as shown in dashed lines in FIG. 2. While, an extrusion blank having a single channel is possible, two parallel channels as shown in FIG. 2 are preferred so that attachment ears for the wiring harness clip 12 can be stamped out of the common web 28 for elongate bases that are stamped out of both channels 24 and 26 on opposite sides of web 28. While extrusion blank 22 is shown as having a substantially uniform thickness, the thickness can be varied. For instance, the web 28 can be extruded thicker in the event that a thicker attachment ear is desired. On the other hand, the channels 24 and 26 can be extruded thicker if a thicker base for the wiring harness clip 12 is desired. Moreover, the channels 24 and 26 can be enlarged and reshaped to increase the wrap of the concave elongate base of the wiring harness clip. In fact, the concave elongated base can be shaped to wrap more than half way around the bundle of electric cables.

Figure 4:
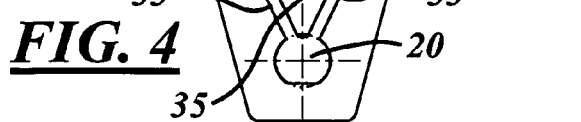
FIG. 4 is a top view of the wiring harness clip of FIG. 1 formed from the extrusion shown in FIG. 2 and applied to a support panel.
Figure 5:
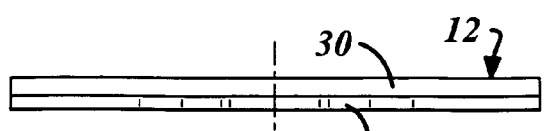
FIG. 5 is a front view of the wiring harness clip of FIG. 1.
Figure 6:
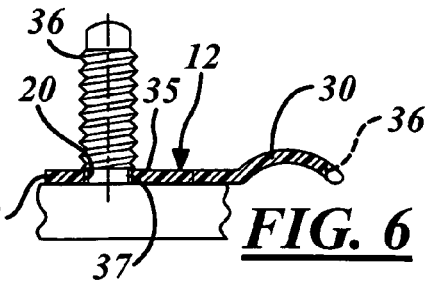
FIG. 6 is a sectional end view of the wiring harness clip of FIG. 1 attached to a stud.

FIGS. 4, 5 and 6 are views of the wiring harness clip 12 that is made from the extrusion blank 22 that is shown in FIG. 2. The wiring harness clip 12 is attached to a bundle of electric cables 14 as shown in FIG. 1 and then attached to support panel 18 using a hole that extends through an attachment ear as shown in FIG. 3.

The wiring harness clip 12 comprises an elongate base 30 that is concave in the extrusion direction x for attaching the wiring harness clip 16 to the bundle of electric cables 14, and the attachment ear 32. Attachment ear 32 extends from an edge of the concave elongate base 30 for attaching the wiring harness clip 12 to the support panel 18 using the hole 20 that extends through the attachment ear 32. Hole 20 may include diverging slots 33 that extend toward the elongate base 30 to provide a resilient finger 35 that provides a retention feature for attaching wiring harness clip 12 to a stud 36 without need for a bolt as shown in FIG. 6. Resilient finger 35 deflects easily over the threads and preferably into an optional annular groove 37 in the stud as wiring harness clip is pushed down but then resists being pulled up with considerable force. In the event that the stud is not threaded, the annular groove 37 in the stud provides cooperating structure for the retention feature.

Attachment ear 32 is preferably flat as most support panels are substantially flat. However, it is possible to shape attachment ear 32 to match an existing support panel that is not flat. Moreover, the concave elongate base 30 can be shaped to increase the wrap around the bundle of electric cables 14 even to the extent of wrapping more than half way around the bundle of electric cables 14. Furthermore while the concave elongate base 30 is illustrated as having an arcuate cross section, other concave shapes are also possible, for instance a V-shaped cross section.

The opposite edge of the concave elongate base 30 preferably includes a shallow depression 34 that forms ribs 36 adjacent opposite ends of the concave elongate base 30. Ribs 36 provide a visual guide for taping the wiring harness clip 12 to the bundle of electric cables 14.

The invention provides a wiring harness clip 12 that has a concave elongate base for taping the wiring harness clip 12 to a bundle of electric cables 14 and an attachment ear for attaching the bundle of electric cables 14 to a support panel or the like, wherein the wiring harness clip 12 is made from an extrusion blank to reduce manufacturing costs.

The extrusion blank 22 for making the wiring harness clips 12 may be of any extrudable material that produces the required strength for the wiring harness clips. Typical materials that can be extruded for automotive applications are nylon, polypropylene and polyethylene.

In the preferred embodiment discussed above, the wiring harness clip 12 is formed, preferably, simply by stamping the wiring harness clip 12 out of a single extrusion blank 22. However, several extrusion blanks 22 may be stacked to stamp several stacks of wiring harness clips simultaneously thus reducing manufacturing cost. Moreover, the extrusion blank 22 can be very long thus reducing manufacturing cost even further.

It other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A method of manufacturing a wiring harness clip having a concave elongate base and an attachment ear comprising:
    extruding a blank having a channel and a web extending laterally from an edge of the channel, and
    stamping the blank so that the concave elongate base is formed from part of the channel and the attachment ear is formed from part of the web to form a wiring harness clip having a concave elongate base and an attachment ear extending from an edge of the concave elongate base wherein stamping the blank follows extruding the blank without any intervening forming.

2. The method of manufacturing a wiring harness clip as defined in claim 1 wherein attachment ear is stamped from the web with a hole so that the attachment ear has a hole for supporting the wiring harness clip on a support panel or the like.

3. The method of manufacturing a wiring harness clip as defined in claim 2 wherein the web of the blank is substantially planar.

4. The method of manufacturing a wiring harness clip as defined in claim 2 wherein the blank is stamped with the attachment ear at one edge of the concave elongate base and ribs at an opposite edge of the concave elongate base.

5. A method of manufacturing wiring harness clips having a concave elongate base and an attachment ear comprising:
    extruding a blank in an extrusion direction so that the blank has a first channel that is parallel to the extrusion direction, a second channel that is parallel to the extrusion direction and that is spaced from the first channel in a lateral direction, and a web between the first channel and the second channel,
    stamping a first wiring harness clip having a concave elongate base and an attachment ear from a part of the first channel and a part of the web, and
    stamping a second wiring harness clip having a concave elongate base and an attachment ear from a part of the second channel and another part of the web.

6. The method of manufacturing wiring harness clips as defined in claim 5 wherein the part and the another part of the web of the extruded blank are each stamped with a hole so that the attachment ear 6f the first wiring harness clip and the attachment ear of the second wiring harness clip each have a hole for supporting the respective wiring harness clips on a support panel or the like.

7. The method of manufacturing wiring harness clips as defined in claim 6 wherein the web of the blank is substantially planar.

8. The method of manufacturing wiring harness clips as defined in claim 6 wherein the extruded blank is stamped with the ear attachment of the first wiring harness clip at one edge of its associated concave elongate base and ribs at an opposite edge of its associated concave elongate base and with the ear attachment of the second wiring harness clip at one edge of its associated concave elongate base and ribs at an opposite edge of its associated concave elongate base.

9. The method of manufacturing wiring harness clips as defined in claim 5 wherein the first wiring harness clip and the second wiring harness clip and several other wiring harness clips are stamped from the blank simultaneously.

10. The method of manufacturing wiring harness clips as defined in claim 9 wherein the first wiring harness clip and the second wiring harness clip and the several other wiring harness clips are stamped from a stack of blanks that are extruded.

11. A method of manufacturing wiring harness clips having concave elongate bases and attachment ears comprising:
    extruding a blank in an extrusion direction so that the blank has a first elongate channel that is parallel to the extrusion direction, a second elongate channel that is parallel to the extrusion direction and that is spaced from the first elongate channel in a lateral direction, and a substantially planar web that extends between the first elongate channel and the second elongate channel, stamping a first wiring harness clip having a concave elongate base and an attachment ear that extends from an edge of the concave elongate base, the concave elongate base being stamped from a part of the first elongate channel and the attachment ear being stamped from a part of the substantially planar web, and stamping a second wiring harness clip having a concave elongate base and an attachment ear that extends from an edge of the concave elongate base, the concave base being stamped from a part of the second elongate channel and the attachment ear being stamped from another part of the substantially planar web wherein the stamping the blank follows the extruding the blank without any intervening forming.

\* \* \* \* \*